(12) United States Patent
Kim et al.

(10) Patent No.: US 7,031,048 B2
(45) Date of Patent: Apr. 18, 2006

(54) HYBRID BROADBAND LIGHT SOURCE

(75) Inventors: Sang-Ho Kim, Suwon-si (KR);
Seong-Taek Hwang, Pyeongtaek-si (KR); Chang-Sup Shim, Seoul (KR); Yun-Je Oh, Yongin-si (KR)

(73) Assignee: Samsung Electronics Co Ltd, Suwon-si (KR)

( * ) Notice: Subject to any disclaimer, the term of this patent is extended or adjusted under 35 U.S.C. 154(b) by 0 days.

(21) Appl. No.: 10/899,572

(22) Filed: Jul. 27, 2004

(65) Prior Publication Data
US 2005/0134185 A1 Jun. 23, 2005

(30) Foreign Application Priority Data
Dec. 19, 2003 (KR) .................. 10-2003-0093857

(51) Int. Cl.
*H01S 3/00* (2006.01)

(52) U.S. Cl. ..................................... 359/333
(58) Field of Classification Search ............... 359/333
See application file for complete search history.

(56) References Cited

U.S. PATENT DOCUMENTS 5,986,790 A * 11/1999 Ota et al. ..................... 398/1
6,912,083 B1 * 6/2005 Ohishi et al. ............... 359/333

* cited by examiner

*Primary Examiner*—Mark Hellner
(74) *Attorney, Agent, or Firm*—Cha & Reiter LLC

(57) ABSTRACT

Disclosed is a hybrid broadband optical source comprising an amplified spontaneous emission (ASE) light source module to generate ASE, a gain medium to amplify the ASE, a pump light source to generate pump light, and a wavelength selective coupler to supply the pump light to the gain medium.

7 Claims, 4 Drawing Sheets

HYBRID BROADBAND LIGHT SOURCE

CLAIM OF PRIORITY

This application claims priority to an application entitled "Hybrid Broadband Light Source," filed with the Korean Intellectual Property Office on Dec. 19, 2003 and assigned Serial No. 2003-93857, the contents of which are hereby incorporated by reference.

BACKGROUND OF THE INVENTION

1. Field of the Invention

The present invention relates to an optical communication device, in particular to a broadband light source.

2. Description of the Related Art

In constructing wavelength division multiplexing passive optical networks (WDM-PON), which are technology candidates for high-speed fiber-to-the-home (FTTH) applications, a low-price broadband light source are required. Together with a wavelength locked (Fabry Perot laser diode (FP-LD), such a broadband light source plays an important role in concurrently accommodating a plurality of subscribers. In addition, when such a broadband light source is employed in an optical communication system incorporating an erbium doped fiber amplifier (EDFA), it is also needed to measure optical characteristics of the communication components in predetermined signal wavelength bands (e.g. 1530 nm~1570 nm, 1570 nm~1610 nm). Existing available broadband light sources mainly employ a white light source incorporating a halogen lamp, an EDFA outputting amplified spontaneous emission (ASE), an edge-emitting light emitting diode (EELED), or a super luminescent diode (SLD). However, white light sources and EELEDs have low output power and are not suitable as a light source for a WDM-PON and SDLs as they output relatively high power. Thus, white light sources and EELEDs are insufficient for use as broadband light sources for a WDM-PON as compared to EDFAs. In fact, EDFAs are commercialized as a broadband light source but are required to have a higher output power over a wide wavelength band when employed as a light source for a WDM-PON. Disadvantageously, however, their construction becomes complicated in order to meet with the above requirements, and thus are not economical in price.

FIG. 1 shows a diagram of a broadband light source according to the prior art. The broadband light source 100 comprises first and second erbium doped optical fibers 140, 145, first and second pump laser diodes 120, 125, first and second wavelength selective couplers (WSCs) 130, 135, a band-pass filter (BPF) 160, and first and second isolators (ISOs) 150, 155. The first wavelength selective coupler 130, the first erbium doped optical fiber 140, the first isolator 150, the band-pass filter 160, the second erbium doped optical fiber 140, the second wavelength selective coupler 135, and the second isolator 155 are connected in series using a first optical waveguide. In addition, the second isolator 155 is connected in parallel to the first erbium doped optical fiber 140 using a second optical waveguide. The second pump laser diode 114 is connected in parallel to the second erbium doped optical fiber 145 using a third optical waveguide.

The first pump laser diode 120 outputs first pump light.

The first wavelength selective coupler 130 is located between a terminal end of the broadband light source 100 and the first erbium doped optical fiber. The first wavelength selective coupler 130 supplies the first pump light to the first erbium doped optical fiber 140.

The first erbium doped optical fiber 140 is located between the first wavelength selective coupler 130 and the first isolator 150. The first erbium doped optical fiber 140 outputs ASE to the front and rear sides as it is pumped by the first pump light. The ASE outputted to the rear side of the first erbium doped optical fiber 140 passes the first wavelength selective coupler 130. Then, the ASE is inputted into the terminal end 102 and disappears. The ASE outputted to the front side of the first erbium doped optical fiber 140 passes the first isolator 150 and the band-pass filter 160, and the ASE is inputted into the second erbium doped optical fiber 145, thus being amplified. Thereafter, the ASE passes the second wavelength selective coupler 135 and the second isolator 155, and the ASE is outputted to the outside through an output end 104 of the broadband light source 100.

The first isolator 150 is located between the first erbium doped optical fiber 140 and the band-pass filter 160. The first isolator 150 passes the ASE inputted from the first erbium doped optical fiber and blocks light progressing in the opposite direction.

The band-pass filter 160 is located between the first isolator 150 and the second erbium doped optical fiber 145. The band-pass filter 160 limits the bandwidth of the ASE passing the first isolator 150 in a wavelength band of 1541 nm~1559 nm in such a manner that high output power can be obtained in the wavelength band.

The second pump laser diode 125 outputs second pump light.

The second wavelength selective coupler 135 is located between the second erbium doped optical fiber 145 and the second isolator 155. The second wavelength selective coupler 135 supplies the second pump light to the second erbium doped optical fiber 145.

The second erbium doped optical fiber 145 is located between the band-pass filter 160 and the second wavelength selective coupler 135. The second erbium doped optical fiber 145 amplifies and outputs the ASE having passed the band-pass filter 160.

The second isolator 155 is located between the second wavelength selective coupler 135 and the output end 104 of the broadband light source 100. The second isolator 155 passes the ASE having passed the second wavelength selective coupler 135 and blocks light progressing in the opposite direction.

FIG. 2 is a graph showing ASE spectrums in regard to positions of the broadband light source shown in FIG. 1. FIG. 2 shows first spectrum 210 in position A, second spectrum 220 in position B, and third spectrum 230 in position C. The first spectrum 210 has lower output power as compared to the third spectrum 220, and the ASE in position C serves as a seed for the second erbium doped optical fiber 145.

However, such a broadband optical source has a number of limitations, including employing expensive components for generating ASE serving as a seed, thus it is not economical. In addition, the ASE is not effective because the portion of the spectrum beyond a predetermined wavelength band is removed in the band-pass filter 160.

SUMMARY OF THE INVENTION

Accordingly, the present invention has been made to reduce or overcome the above-mentioned problems occurring in the prior art. One object of the present invention is to provide a broadband light source which can obtain high output power in a selective wavelength band in an economical and effective manner.

In accordance with the principles of the present invention, a hybrid broadband optical source is provided and includes: an amplified spontaneous emission (ASE) light source module to generate ASE, a gain medium to amplify the ASE, a pump light source to generate pump light, and a wavelength selective coupler to supply the pump light to the gain medium.

BRIEF DESCRIPTION OF THE DRAWINGS

The present invention will be more apparent from the following detailed description taken in conjunction with the accompanying drawings, in which.

DETAILED DESCRIPTION

Hereinafter, preferred embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
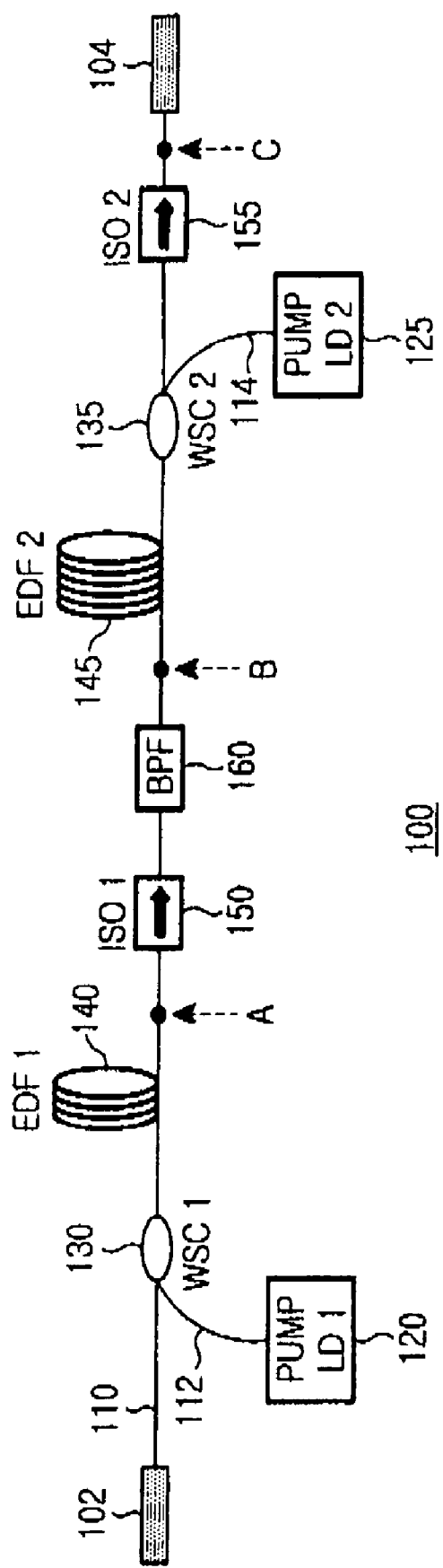
FIG. 1 is a diagram of a broadband light source according to the prior art.
Figure 2:
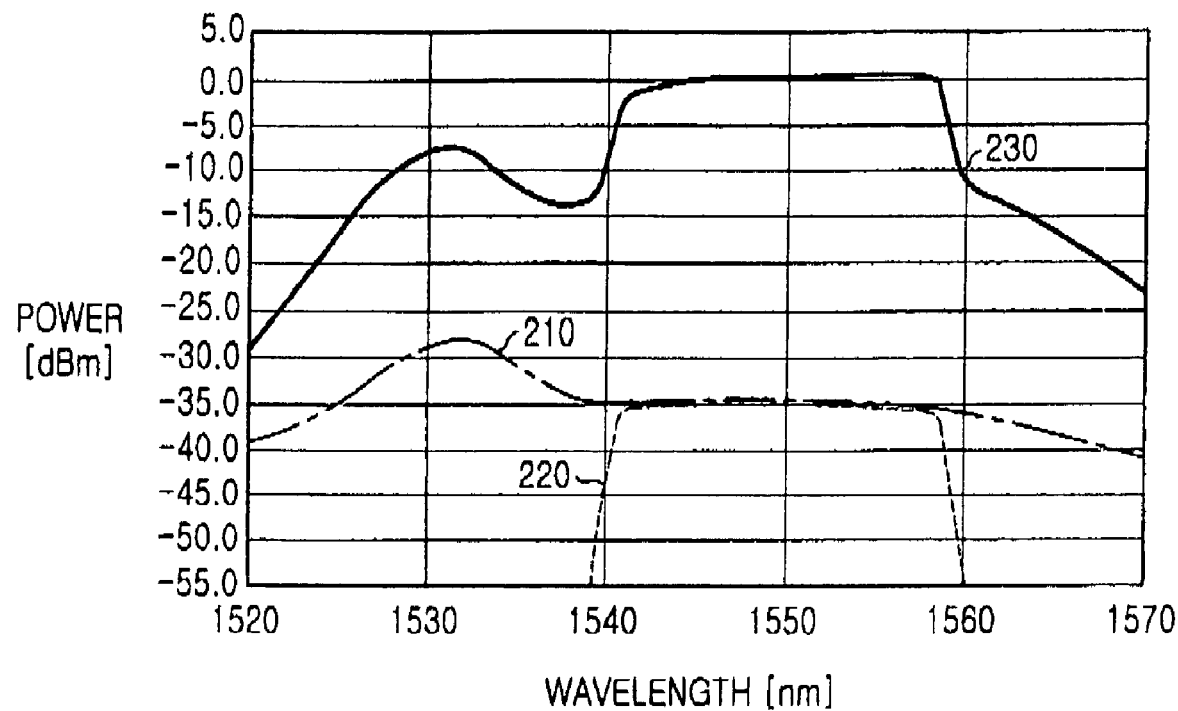
FIG. 2 is a graph showing ASE spectrums in regard to positions of the broadband light source shown in FIG. 1.
Figure 3:
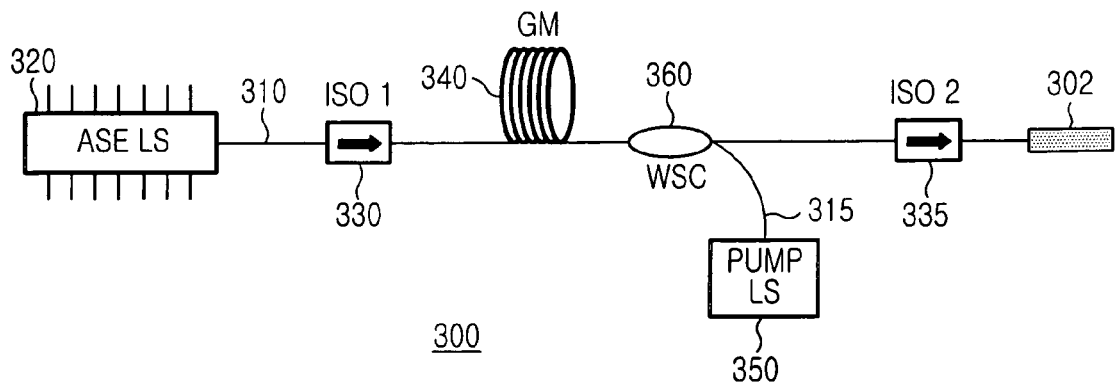
FIG. 3 is a diagram of a hybrid broadband light source according to a first embodiment of the present invention.

FIG. 3 is a diagram of a hybrid broadband light source according to a first embodiment of the present invention. The broadband light source 300 comprises an ASE light source module 320, first and second isolators 330, 335, a gain medium 340, a pump light source 350, and a wavelength selective coupler 360. The ASE light source module 320, the first isolator 330, the gain medium 340, the wavelength selective coupler 360, and the second isolator 335 are connected in series using a first optical waveguide 310. The pump light source 350 is connected in parallel to the gain medium 340 using a second optical waveguide 315.

The ASE light source module 320 is installed at a terminal end of the broadband light source 300. The ASE light source module 320 generates and outputs ASE. The ASE light source module 320 is a semiconductor ASE light source of a single module and may incorporate an ASE light source fabricated from a low-price semiconductor including a low-price EELED or SLD having the desired wavelength band.

The first isolator 330 is located between the ASE light source module 320 and the gain medium 340. The first isolator passes the ASE inputted from the ASE light source module 320 and blocks light progressing in the opposite direction.

The pump light source 350 outputs pump light and may incorporate a laser diode with a wavelength of 980 nm or 1480 nm.

The wavelength selective coupler 360 is located between the gain medium 340 and the second isolator 335. The wavelength selective coupler 360 supplies the pump light to the gain medium 340.

The gain medium 340 is located between the first isolator 330 and the wavelength selective coupler 360. The gain medium 340 amplifies and outputs the ASE having passed the first isolator 330 as it is pumped by the pump light. The ASE amplified by and outputted from the gain medium 340 passes the wavelength selective coupler 360 and the second isolator 335. Then, the ASE is outputted to the outside through an output end 302 of the broadband light source 300. When a thulium doped fiber (TDF) is used as the gain medium 340, it is possible to obtain ASE which has high output power in a wavelength band of 1450 nm~1510 nm. When a praseodymium doped fiber (PDF) is used, it is possible to obtain ASE which has high output power in a wavelength band of 1270 nm~1330 nm. Accordingly, in order to obtain ASE in a desired wavelength band, a gain medium having a high gain spectrum within a corresponding wavelength band and a pump light source capable of exciting the gain medium need be used. That is, because the broadband light source 300 is able to employ all the conventionally applicable gain mediums, the wavelength band of the broadband light source 300 is expandable over an entire available wavelength band without being limited to a certain band.

The second isolator 335 is located between the wavelength selective coupler 360 and the output end of the broadband light source 300. The second isolator 335 passes the ASE having passed the wavelength selective coupler 360 and blocks light progressing in the opposite direction.

Figure 4:
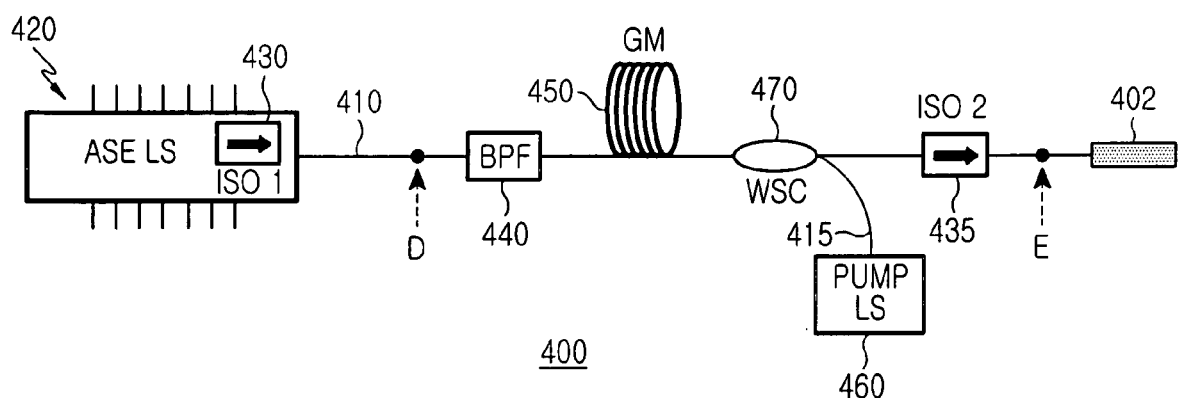
FIG. 4 is a diagram of a hybrid broadband light source according to a second embodiment of the present invention.

FIG. 4 is a diagram of a hybrid broadband light source according to a second embodiment of the present invention. The broadband light source 400 comprises an ASE light source module 420, a band-pass filter 440, a gain medium 450, a pump light source 460, a wavelength selective coupler 470, and a second isolator 435. The ASE light source module 420, the band-pass filter 440, the gain medium 450, the wavelength selective coupler 470, and the second isolator 435 are connected in series using a first optical waveguide 410. The pump light source 460 is connected in parallel to the gain medium 450 using a second optical waveguide 415.

The ASE light source module 420 is installed at a terminal end of the broadband light source 300. The ASE light source module 420 generates and outputs ASE. At an output end of the ASE light source module 420, a first isolator 430 is directly integrated, and the first isolator 430 passes the ASE inputted to the first isolator and blocks light the opposite direction.

The band-pass filter 440 is located between the ASE light source module 420 and the gain medium 450. The band-pass filter 440 limits the bandwidth of the ASE spectrum generated light source module 420 as the wavelength band of 1530 nm~1570 μm, and the gain medium 450 can amplify this wavelength band ASE effectively. Thus, high output power can be obtained.

The pump light source 460 outputs pump light.

The wavelength selective coupler 470 is located between the gain medium 450 and the second isolator 435. The wavelength selective coupler 470 supplies the pump light to the gain medium 450.

The gain medium 450 is located between the band-pass filter 440 and the wavelength selective coupler 470. The gain medium 450 amplifies and outputs ASE having passed the band-pass filter 440, as it is pumped by the pump light. The ASE amplified by and outputted from the gain medium 450 passes the wavelength selective coupler 470 and the second isolator 435. Then, the ASE is outputted through the output end of the broadband light source 400.

Figure 5:
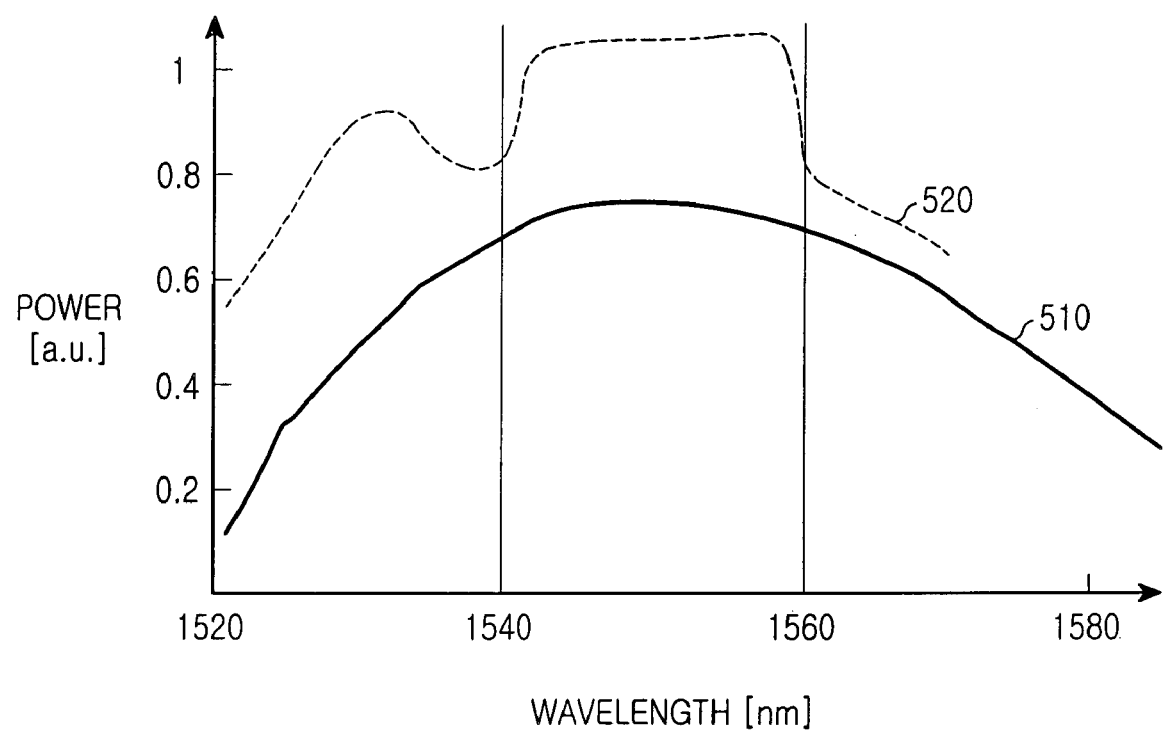
FIG. 5 is a graph showing ASE spectrums in regard to positions of the broadband light source shown in FIG. 4.

FIG. 5 is a graph of ASE spectrums in regard to positions of the broadband light source shown in FIG. 4. FIG. 5 shows first spectrum 510 in position D, and second spectrum 520 in position E. It can be seen that the ASE of position D having the first spectrum 510 appears high output power in the wavelength band of 1540 nm~1560 nm by passing the band-pass filter 440 and the gain medium 450.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A hybrid broadband optical source comprising:
    an amplified spontaneous emission (ASE) light source module to generate ASE and having a first isolator integrated at the output end thereof;
    a gain medium to amplify the ASE;
    a pump light source to generate pump light; and
    a wavelength selective coupler to supply the pump light to the gain medium, wherein the first isolator is configured to pass the ASE inputted into the first isolator and block light progressing in the opposite direction.

2. The hybrid broadband light source as claimed in claim 1, wherein the gain medium is connected in series to the ASE light source module.

3. The hybrid broadband light source as claimed in claim 1, further comprising a second isolator coupled between the wavelength selective coupler and the output end of the broadband light source, the second isolator configured to pass the ASE that has passed the wavelength selective coupler and block light progressing in the opposite direction.

4. The hybrid broadband light source as claimed in claim 1, further comprising a band-pass filter coupled between the ASE light source module and the gain medium, the band-pass filter having a predetermined wavelength band to filter the ASE inputted from the ASE light source module.

5. The hybrid broadband light source as claimed in claim 4, further comprising a second isolator coupled between the wavelength selective coupler and the output end of the broadband light source, the second isolator configured to pass ASE having passed the wavelength selective coupler and block light progressing in the opposite direction.

6. The hybrid broadband light source as claimed in claim 1, wherein the gain medium includes a thulium doped fiber or a praseodymium doped fiber.

7. The hybrid broadband light source as claimed in claim 1, wherein the ASE light source module is a semiconductor ASE light source of a single module.

* * * * *